(12) United States Patent
Hayashi et al.

(10) Patent No.: US 8,052,411 B2
(45) Date of Patent: Nov. 8, 2011

(54) DIE FOR FORMING HONEYCOMB STRUCTURE

(75) Inventors: Seiichiro Hayashi, Nagoya (JP);
Masanari Iwade, Nagoya (JP);
Hirofumi Hosokawa, Nagoya (JP);
Hironori Takahashi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 12/263,020

(22) Filed: Oct. 31, 2008

(65) Prior Publication Data
US 2009/0061040 A1 Mar. 5, 2009

Related U.S. Application Data

(63) Continuation of application No. PCT/JP2007/074517, filed on Dec. 20, 2007.

(30) Foreign Application Priority Data

Dec. 26, 2006 (JP) ................................. 2006-350551

(51) Int. Cl.
*B29C 47/12* (2006.01)
(52) U.S. Cl. ............... 425/192 R; 264/177.12; 425/380; 425/461; 425/467
(58) Field of Classification Search .............. 425/192 R, 425/380, 461, 467; 264/177.12
See application file for complete search history.

(56) References Cited

U.S. PATENT DOCUMENTS

| 4,814,187 A | 3/1989 | Inoue et al. |
|---|---|---|
| 4,820,146 A | 4/1989 | Inoue et al. |
| 5,238,386 A * | 8/1993 | Cunningham et al. ..... 425/192 R |
| 5,256,054 A * | 10/1993 | Cocchetto et al. ............ 425/462 |
| 2005/0118296 A1 | 6/2005 | Kaneko et al. |
| 2006/0018988 A1* | 1/2006 | Kuwahara et al. ............ 425/380 |
| 2006/0034972 A1 | 2/2006 | Takahashi et al. |
| 2008/0113858 A1 | 5/2008 | Kaneko et al. |
| 2010/0244309 A1* | 9/2010 | Hayashi et al. .......... 264/177.12 |

FOREIGN PATENT DOCUMENTS

| JP | A 62-94320 | 4/1987 |
|---|---|---|
| JP | A 63-47104 | 2/1988 |
| JP | U 63-18209 | 2/1988 |
| JP | A 10-315213 | 12/1998 |
| JP | A 2000-326318 | 11/2000 |
| JP | A 2003-285308 | 10/2003 |
| JP | A 2006-051682 | 2/2006 |

* cited by examiner

*Primary Examiner* — Yogendra Gupta
*Assistant Examiner* — Joseph Leyson
(74) *Attorney, Agent, or Firm* — Oliff & Berridge, PLC

(57) ABSTRACT

A plate-like shape die 1 for forming a honeycomb structure provided with an introduction portion 3 having plural back holes on one side face (an introduction side) thereof and a formation portion provided with silts 6 communicating with plural back holes 7 on other side face thereof; using for forming a honeycomb shape with passing raw materials being introduced from back holes 7 of an introduction portion 3 through silts 6 being provided on the forming portion 2, wherein the introduction portion 3 is composed of two layers of a plate-like abrasion portion 5 constituting an introduction face 8, and an introduction portion main body 4 located between the abrasion portion 5 and the forming portion 2, and the abrasion portion 5 is detachably disposed on the introduction portion main body 4.

8 Claims, 1 Drawing Sheet

US 8,052,411 B2

DIE FOR FORMING HONEYCOMB STRUCTURE

CROSS REFERENCE TO RELATED APPLICATION

This application is a continuation of PCT/JP2007/074517, filed on Dec. 20, 2007, which claims foreign priority to JP 2006-350551, filed on Dec. 26, 2006.

TECHNICAL FIELD

The present invention relates to a die for forming a honeycomb structure and, in more detail, to a die for forming a honeycomb structure capable of easily changing an abrasion portion even if a surface (introduction face) on the raw material introduction side is worn to maintain a shape of a honeycomb structure formed in good conditions.

BACKGROUND ART

As a method for manufacturing a ceramic honeycomb structure, there is widely used a method where extrusion forming is conducted by the use of a die for forming a honeycomb structure, the die having back holes for introducing forming raw material (clay) and lattice-shaped slits communicating with the back holes. The die generally has an introduction portion where a plurality of back holes are open in a large area on a surface (introduction face) on one side and a forming portion where slits having a width corresponding with partition wall thickness of the honeycomb structure are provided in a lattice shape or the like on a face (the other face) on the opposite side. The back holes are generally provided so as to correspond with the positions where the slits of a lattice shape or the like cross, and the back holes and the slits communicates with each other inside the die. Therefore, a forming raw material such as ceramic raw material introduced from the back holes moves from the back holes, which have a relatively large inner diameter, to the narrow slits and is extruded as a honeycomb structure formed body from opening portions of the slits.

As such a die for forming a honeycomb structure, there has been used a plate-like member constituted of one kind of alloy such as stainless-steel alloy and sintered hard alloy, or a plate-like member formed by bonding two different kinds of plate-like members (see, e.g., Patent Documents 1 to 4).
 Patent Document 1: JP-A-2000-326318
 Patent Document 2: JP-A-2003-285308
 Patent Document 3: JP-A-H10-315213
 Patent Document 4: JP-A-2006-51682

DISCLOSURE OF THE INVENTION

However, since a die using stainless steel or the like has low abrasion resistance, it requires a measure for inhibiting abrasion by various kinds of surface treatments, and it has a problem of abrasion of slits in continuous extrusion forming to gradually change a shape of a honeycomb structure obtained by extrusion forming. Since a die substrate using sintered hard alloy has excellent abrasion resistance, abrasion of slits can be reduced. However, it has a problem of requiring much labor and time when back holes having little influence by abrasion or the like are formed. In addition, there is a problem of having a crack of the die due to pressure upon extrusion since sintered hard alloy is a brittle material.

The present invention has been made in view of the above problems and is characterized by providing a die for forming a honeycomb structure, the die being capable of easily changing an abrasion portion even if a surface (introduction face) on the raw material introduction side is worn upon extrusion forming to maintain a shape of a honeycomb structure formed in good conditions.

In order to achieve the above aim, according to the present invention, there are provided the following dies for forming a honeycomb structure.

[1] A die for forming a honeycomb structure, the die having a plate-like shape and comprising: an introduction portion provided on a face (introduction face) on one side and having a plurality of back holes, and a forming portion provided on a face on the other side and provided with slits communicating with the back holes, the die forming a forming raw material introduced from the back holes in the introduction portion bypassing the raw material through the slits in the forming portion; wherein the introduction portion comprises two layers of a plate-like abrasion portion constituting the introduction face and an introduction portion main body located between the abrasion portion and the forming portion, and the abrasion portion is detachably disposed on the introduction portion main body.

[2] The die for forming a honeycomb structure according to [1], wherein the abrasion portion has a thickness of 0.5 to 5.0 mm.

[3] The die for forming a honeycomb structure according to [1] or [2], wherein a material for the abrasion portion is stainless steel, tool steel, or sintered hard alloy.

[4] The die for forming a honeycomb structure according to any one of [1] to [3], wherein the abrasion portion is subjected to a surface treatment by CVD, PVD, or hard plating.

According to a die for forming a honeycomb structure of the present invention, the introduction portion has two layers of a plate-like abrasion portion constituting an introduction face and an introduction portion main body, and the abrasion portion is detachably disposed on the introduction portion main body. Therefore, even if the introduction face of the die for forming a honeycomb structure is worn by the use to cause deformation of a shape of a honeycomb structure obtained by extrusion forming, a good shape of a honeycomb structure can easily be maintained by changing only the abrasion portion.

DESCRIPTION OF REFERENCE NUMERALS

1: a die for forming a honeycomb structure, 2: forming portion, 3: introduction portion, 4: introduction portion main body, 5: abrasion portion, 6: slit, 7: back hole, 8: introduction face, 11: masking plate, 12: adjustment ring, 13: spacer, A: flow direction of forming raw material, Al: flow in a lateral direction

BEST MODE FOR CARRYING OUT THE INVENTION

Hereinbelow, the best mode for carrying out the present invention will be described specifically with referring to drawings. However, the present invention is by no means limited to the following embodiments, and it should be understood that modifications, improvements, or the like, of the design may suitably be added thereto on the basis of ordinary knowledge of those skilled in the art within the range of not deviating from the gist of the present invention.

Figure 1:
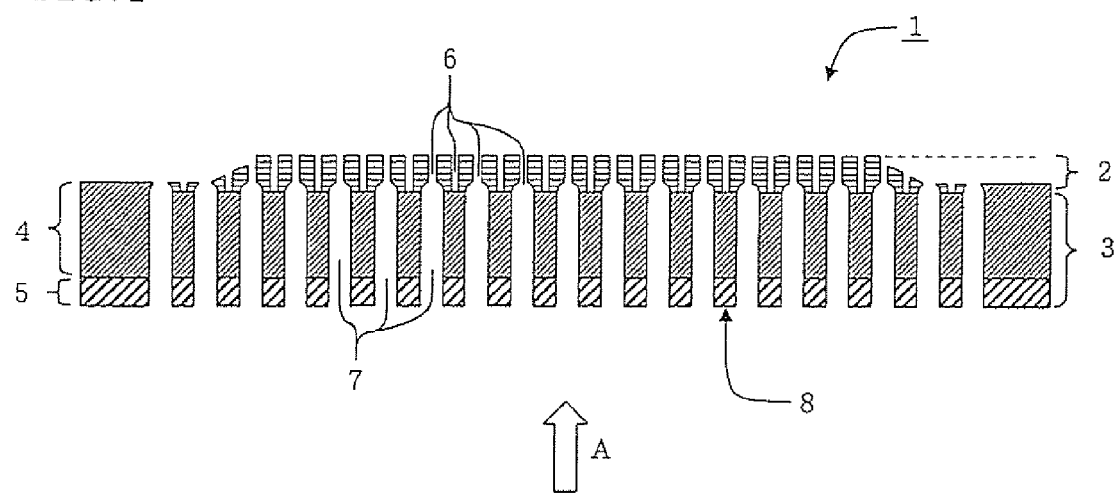
FIG. 1 is a cross-sectional view schematically showing an embodiment of a die for forming a honeycomb structure of the present invention and being in parallel with an extending direction of the back holes.

FIG. 1 is a cross-sectional view schematically showing an embodiment of a die for forming a honeycomb structure of the present invention and being in parallel with an extending direction (flow direction of forming raw material) of the back holes. As shown in FIG. 1, a die 1 for forming a honeycomb structure of the present embodiment is a plate-shaped die provided with an introduction portion 3 arranged on a face (introduction face 8) on one side and having a plurality of back holes 7 and a forming portion 2 arranged on a face on the other side and having slits 6 communicating with the back holes 7. The introduction portion 3 is constituted of two layers of a plate-shaped abrasion portion 5 constituting the introduction face 8 and an introduction portion main body 4 located between the abrasion portion 5 and the forming portion 2, and the abrasion portion 5 is detachably disposed on the introduction portion main body 4. According to the die 1 for forming a honeycomb structure of the present embodiment, a forming raw material introduced from the back holes 7 of the introduction portion 3 can be passed though the slits 6 of the forming portion 2 to form the material into a honeycomb shape. The slits 6 are preferably formed into a lattice shape in a face perpendicular to the flow direction of the forming raw material, and the back holes 7 are preferably arranged so as to correspond with the positions where the lattice-shaped slits 6 cross. Incidentally, the slits 6 may be disposed so as to extend from the forming portion 2 to a part of the introduction portion 3 with the back holes 7 being formed in the introduction portion 3 so as to communicate with the slits 6. Alternatively, the back holes 7 may be disposed so as to extend from the introduction portion 3 to a part of the forming portion 2 with the slits 6 being formed so as to communicate with the back holes 7.

Since the introduction portion 3 is thus constituted of two layers of the plate-like abrasion portion 5 constituting the introduction face 8 and the introduction portion main body 4 with the abrasion portion 5 being detachably disposed on the introduction portion main body 4, a good shape of a honeycomb structure can easily be maintained by changing only the abrasion portion 5 even if the introduction face 8 of the die 1 for forming a honeycomb structure is worn to almost deform the shape of the honeycomb structure obtained by extrusion forming.

Figure 2:
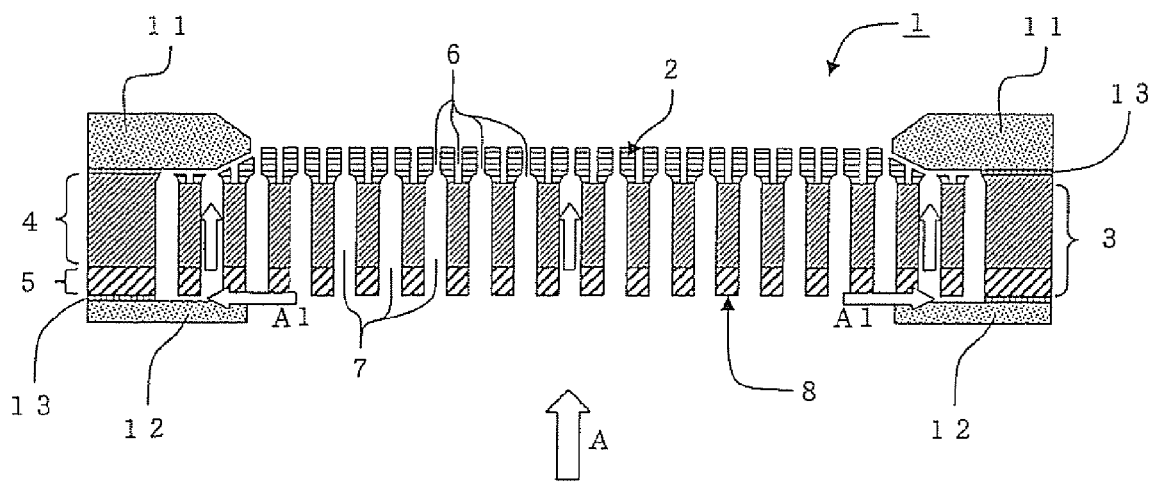
FIG. 2 is a cross-sectional view schematically showing a state of fixing an embodiment of a die for forming a honeycomb structure of the present invention with a holding plate in a tip portion of an extruder and being in parallel with an extending direction of the back holes.

FIG. 2 is a cross-sectional view schematically showing a state of fixing an embodiment of a die for forming a honeycomb structure of the present invention with a holding plate in a tip portion of an extruder and being in parallel with an extending direction of the back holes. In FIG. 2, the other portion of the extruder is omitted. In FIG. 2, the die 1 for forming a honeycomb structure is disposed in such a manner that the forming portion 2 faces downstream side (introduction portion 3 faces upstream side) and fixed by the back holding plate 12 located on the upstream side and the holding plate 11 located on the downstream side via spacers 13. Here, the upstream side means the upstream side in the flow direction (extrusion direction) of the forming raw material, and the downstream side means the downstream side in the flow direction (extrusion direction) of the forming raw material.

As shown in FIG. 2, when the forming raw material is allowed to flow in the flow direction A to introduce the material into the die 1 for forming a honeycomb structure, much of the forming raw material is introduced into the back holes 7 of the introduction portion 3 as it is, moves to the narrow slits 6, and extruded as a honeycomb structure formed body from the opening portions of the slits. A part of the forming raw material enters the gap between the die 1 for forming a honeycomb structure and the back holding plate 12 as shown by the flow A1 (flow in the lateral direction) of the forming raw material, passes through the gap to be introduced into the back holes 7, and is extruded outside from the space between the holding plate 11 and the forming portion 2. The forming raw material extruded from the holding plate 11 and the forming portion 2 at this time forms an outer peripheral wall of the honeycomb structure.

In the die 1 for forming a honeycomb structure of the present embodiment disposed as shown in FIG. 2, the introduction face 8 is remarkably worn particularly by the flow A1 in the lateral direction after extrusion molding is continued. That is, in the introduction face 8, a portion which the back holding plate 12 covers is worn in a large amount. Since the gap between the introduction face 8 and the back holding plate 12 becomes uneven and large when such abrasion is generated, a flow rate of the flow A1 in the lateral direction, that is, a feed amount of the forming raw material for forming the outer peripheral wall of the honeycomb structure becomes uneven and large, which leads to a problem of deformation of the honeycomb structure.

When the introduction face 8 is thus worn, a conventional die for forming a honeycomb structure requires change of the entire die or machining of the worn introduction face to be flat by a grinding process or the like. However, the die 1 for forming a honeycomb structure of the present embodiment, it is sufficient to change the abrasion portion 5. Therefore, conditions of the die 1 for forming a honeycomb structure can easily be maintained well at low costs.

The forming portion 2 and the introduction portion main body 4 constituting the die 1 for forming a honeycomb structure of the present embodiment may unitarily be formed or may be formed by bonding two kinds of members (maybe two members of the same kind) with a bonding material. In addition, the abrasion portion 5 is preferably disposed detachably on the introduction portion main body 4 by bolting, fastening with a pin, etc.

The abrasion portion 5 has a thickness of preferably 0.5 to 5.0 mm, and more preferably 1.0 to 3.0 mm. When the thickness is less than 0.5 mm, the abrasion portion 5 may have to be changed before the shape of a honeycomb structure obtained by extrusion forming is deformed. When the thickness is more than 5.0 mm, the die for forming a honeycomb structure may be too thick, and thereby pressure loss may be increased upon extrusion forming.

It is preferable that the back holes 7 of the abrasion portion 5 are formed so as to have the same diameter in the same positions as the corresponding back holes 7 of the introduction portion main body 4. However, since there is much concern that a relative deviation of the back holes 7 between the abrasion portion 5 and the introduction portion main body 4 due to a positional deviation of the back holes 7 or a hole diameter variance, it is preferable that the back holes 7 of the abrasion portion 5 have a diameter of 0.020 to 0.150 mm larger or smaller than that of the back holes 7 of the introduction portion main body 4. This enables uniformalization of the pressure loss on the introduction face 8.

The thickness (length in the flow direction of the forming raw material) of the forming portion 2 constituting the die 1 for forming a honeycomb structure of the present embodiment is not particularly limited. However, it is preferably 1.0 to 7.0 mm from the viewpoint of formability or the like of a honeycomb structure.

In addition, the thickness of the introduction portion 3 constituting the die 1 for forming a honeycomb structure of the present embodiment is not particularly limited. However, it is preferably 10 to 100 mm from the viewpoint of strength against pressure upon extrusion forming and pressure loss.

The material for a die 1 for forming a honeycomb structure of the present embodiment is not particularly limited. However, it is preferable to use a material having high abrasion resistance. In addition, the forming portion 2, introduction portion main body 4, and abrasion portion 5 constituting the die I for forming a honeycomb structure may employ the same material, only one of them may employ a different material, or all of them may employ different materials. Examples of the material for the forming portion 2 include stainless steel, tool steel, and sintered hard alloy. Examples of the material for the introduction portion main body 4 include stainless steel, tool steel, and sintered hard alloy. Examples of the material for the abrasion portion 5 include stainless steel, tool steel, and sintered hard alloy. It is preferable to use stainless steel, tool steel, or the like, which are inexpensive, for the abrasion portion 5 since the abrasion portion is to be changed due to abrasion. When the forming portion 2 and the introduction portion main body 4 are formed by bonding two kinds of members with a bonding material, examples of the bonding material include metals such as copper, silver, gold, nickel, and aluminum, and alloys containing at least one of these metals.

It is preferable that the abrasion portion 5 is subjected to a surface treatment by CVD, PVD, or hard plating. This enables to improve abrasion resistance. A surface treatment by CVD (Chemical Vapor Deposition) can be conducted by, for example, a plasma CVD method. In addition, in a surface treatment by PVD (ion plating), coating is applied on a surface of the abrasion portion at a low temperature of 200 to 550° C. by the use of plasma energy. A surface treatment by hard plating can be conducted by electroplating or electroless plating.

The die 1 for forming a honeycomb structure of the present embodiment is plate-like. However, the outer peripheral shape is not particularly limited and can suitably be determined according to the shape of the tip of an extruder to be used. Examples of the outer peripheral shape include a circle and an ellipse. The outer peripheral shape is also the outer peripheral shape of the forming portion 2, introduction portion 3, and abrasion portion 5. The shape of the disposition region (region on each surface of the die 1 for forming a honeycomb structure) of the back holes 7 and the slits 6 formed in the die 1 for forming a honeycomb structure is not particularly limited and can suitably be determined according to the shape of the honeycomb structure to be formed. Examples of the shape include a circle, an ellipse, a rectangle, a hexagon, and other polygons.

The size of the die 1 for forming a honeycomb structure of the present embodiment is not particularly limited and can suitably be determined according to the size of the honeycomb structure to be formed. For example, when the die is disk-like, a die having a diameter of 150 to 600 mm and a thickness of 10 to 100 mm can suitably be employed.

The slits 6 formed in the forming portion 2 of the die 1 for forming a honeycomb structure of the present embodiment are preferably formed into a lattice shape. Preferable shapes of the lattice are a rectangle, a hexagon, and other polygons. The width of the slits 6 and the interval between adjacent slits 6 are not particularly limited and can suitably be determined according to the partition wall thickness of the honeycomb structure to be formed and the size of the cells. For example, the width of the slits is preferably about 0.050 to 0.400 mm, and the interval between adjacent slits is preferably about 0.60 to 2.50 mm. In addition, the number of slits is not particularly limited, either, and can suitably be determined according to the outside dimensions of the honeycomb structure to be formed.

The shape of a cross section in parallel with the introduction face 8 of the back holes 7 formed in the introduction portion 3 of the die 1 for forming a honeycomb structure of the present embodiment is not particularly limited and can suitably be determined according to processability, flowability of forming raw material, and the like. Examples of the shape include a circle, an ellipse, and polygons such as a rectangle.

In addition, the positions for disposing the back holes 7 are not particularly limited, it is preferable to form the back holes 7 so as to communicate with the intersections of the slits 6 formed in a lattice shape, and it is more preferable to dispose the back holes 7 in such a manner that the center of each of the back holes 7 locates in the intersection of the slits 6. The diameter (diameter of a cross section in parallel with the introduction face 8) of the back holes 7 and the distance between adjacent back holes 7 are not particularly limited and can suitably be determined according to the width of the slits 6, positions for formation, and the like. For example, when a cross-sectional shape of a back hole is a circle, the diameter is preferably about 0.50 to 2.50 mm.

Next, a method for manufacturing an embodiment of a die for forming a honeycomb structure of the present invention will be described.

In a method for manufacturing an embodiment of a die for forming a honeycomb structure of the present invention, in the first place, a plate-like first member for the forming portion and a plate-like second member for the introduction portion main body are bonded together to form a bonded body. Though the forming portion and the introduction portion main body may be formed unitarily by forming slits on one surface side and back holes on the other surface side of a plate-like member, a case of forming a bonded body will be described here.

It is preferable to employ, for the first member, the material described as the material for the forming portion (hereinafter sometimes referred to as "the above forming portion") in one embodiment of a die for forming a honeycomb structure of the present invention and to employ, for the second member, the material described as the material for the introduction portion main body (hereinafter sometimes referred to as "the above introduction portion main body") in one embodiment of a die for forming a honeycomb structure of the present invention. It is preferable that the first member has the same thickness, outer peripheral shape, and the like, as those of the above forming portion and that the second member has the same thickness, outer peripheral shape, and the like, as those of the above introduction portion main body.

Next, slits are formed on the first member side of the bonded body, and back holes are formed on the second member side so as to communicate with the slits. In the steps of forming the slits and the back holes, there may be employed the same method as the method for manufacturing a conventional die for forming a honeycomb structure. For example, the slits can be formed by grinding processing with a grind stone or by electro-discharge machining (EDM) The back holes can be formed by laser processing, drilling, electrolytic processing, or the like.

Incidentally, though the slits and the back holes may be formed after bonding the first member and the second member, a part of the slits and/or a part of or all the back holes may be formed in at least one of the members before bonding.

The shapes, sizes, and the like of the slits and the back holes are preferably the same as those of the slits and the back holes in the above embodiment of a die for forming a honeycomb structure of the present invention.

The abrasion portion can be manufactured by forming the back holes having the same size in the same positions as the back holes formed in the above introduction portion main body in a plate-like third member. It is preferable that the third member has the same thickness, outer peripheral shape, and the like as the abrasion portion in the above embodiment of a die for forming a honeycomb structure of the present invention. The back holes can be formed by laser processing, drilling, electrolytic processing, or the like.

Next, the abrasion portion is detachably disposed on the introduction portion main body side of the bonded body having the above slits and back holes formed therein by screw clamping or fastening with a pin to obtain a die for forming a honeycomb structure of the present embodiment. At this time, as shown in FIG. 1, the abrasion portion 5 is preferably attached in such a manner that the positions of the back holes 7 formed in the abrasion portion 5 coincides with the positions of the back holes 7 formed in the introduction portion main body 4.

INDUSTRIAL APPLICABILITY

A die for forming a honeycomb structure of the present invention can be used for extrusion forming of a ceramic honeycomb structure. According to the present invention, even if the surface (introduction face) on the raw material introduction side is worn upon extrusion forming, the abrasion portion can easily be changed to maintain a shape of a honeycomb structure formed in good conditions.

The invention claimed is:

1. A die for forming a honeycomb structure, the die having a plate-like shape and comprising:
    an introduction portion provided on an introduction face on one side and having a plurality of back holes;
    a forming portion provided on a face on an other side and provided with slits communicating with the back holes, the die forming a forming raw material introduced from the back holes in the introduction portion by passing the forming raw material through the slits in the forming portion in a first direction; and
    a back holding plate disposed on a periphery of a plate-like shape abrasion portion, extending inward from the periphery of the abrasion portion, covering at least one of the back holes, and directing the forming raw material in a second direction other than that of the first direction, wherein
    the introduction portion comprises two layers of the abrasion portion constituting the introduction face and an introduction portion main body located between the abrasion portion and the forming portion,
    the abrasion portion is detachably disposed on the introduction portion main body, and the abrasion portion has a thickness of 0.5 to 5.0 mm,
    the forming portion and the introduction portion main body are respectively formed of a single plate-like shape member, or the forming portion and the introduction portion main body are unitarily formed, and
    the back holes of the abrasion portion have a diameter of 0.020 to 0.150 mm larger than that of the back holes of the introduction portion main body, wherein
    the back holes of the abrasion portion and the introduction portion main body are coaxial.

2. The die for forming a honeycomb structure according to claim 1, wherein a material for the abrasion portion is stainless steel, tool steel, or sintered hard alloy.

3. The die for forming a honeycomb structure according to claim 1, wherein the abrasion portion is subjected to a surface treatment by CVD, PVD, or hard plating.

4. The die for forming a honeycomb structure according to claim 2, wherein the abrasion portion is subjected to a surface treatment by CVD, PVD, or hard plating.

5. The die for forming a honeycomb structure according to claim 1, further comprising a holding plate disposed on a periphery of the forming portion, extending inward from the periphery of the forming portion, covering at least one of the slits, and directing the raw forming material in a third direction other than that of the first direction.

6. The die for forming a honeycomb structure according to claim 1, wherein the second direction is substantially perpendicular to the first direction.

7. The die for forming a honeycomb structure according to claim 5, where the third direction is substantially perpendicular to the first direction.

8. The die for forming a honeycomb structure according to claim 1, wherein the back holding plate is configured to direct the forming raw material in the second direction to enter all the at least one of the back holes covered by the back holding plate.

* * * * *